United States Patent [19]

van Bogaert et al.

[11] Patent Number: 5,020,574

[45] Date of Patent: Jun. 4, 1991

[54] MECHANISM FOR MOUNTING A PART ON A LOOM SLEY

[75] Inventors: Philippe van Bogaert, Schaarbeek; Rik Hillaert, Avelgem, both of Belgium

[73] Assignee: PIC ANOL N.V., naamloze vennootschap, Belgium

[21] Appl. No.: 508,182

[22] Filed: Apr. 12, 1990

[30] Foreign Application Priority Data

Apr. 28, 1989 [BE] Belgium .............................. 8900468

[51] Int. Cl.⁵ ............................................ D03D 49/62
[52] U.S. Cl. .................................. 139/188 R; 139/192; 403/374
[58] Field of Search ............................ 139/188 R, 192; 403/374, 409.1, 370; 407/101, 108, 49

[56] References Cited

U.S. PATENT DOCUMENTS

| | | | |
|---|---|---|---|
| 1,472,565 | 10/1923 | Manning | 403/370 X |
| 3,700,292 | 10/1972 | Owens | |
| 4,057,294 | 11/1977 | Krekeler | |
| 4,730,644 | 3/1988 | Schwarz | |
| 4,732,178 | 3/1988 | Schwarz | |
| 4,744,692 | 5/1988 | Olsen et al. | 403/374 |
| 4,772,166 | 9/1988 | Shamah et al. | |

Primary Examiner—Andrew M. Falik
Attorney, Agent, or Firm—Bacon & Thomas

[57] ABSTRACT

A mechanism for mounting a part on the sley of a weaving machine includes a holder in which a relay nozzle of the weaving machine is mounted, a groove extending over the length of the sley, a clamp to be mounted in the groove and having on opposite sides two mutually inclined gripping faces; and screws which fit through openings in the holder and which act on the clamp to cause the clamp to draw the holder against the sley as the screws are tightened, thereby producing a gripping force in both gripping faces. The holder, when mounted, is clamped on at least one side between a corresponding gripping face of the clamp and a lateral side of the groove.

12 Claims, 2 Drawing Sheets

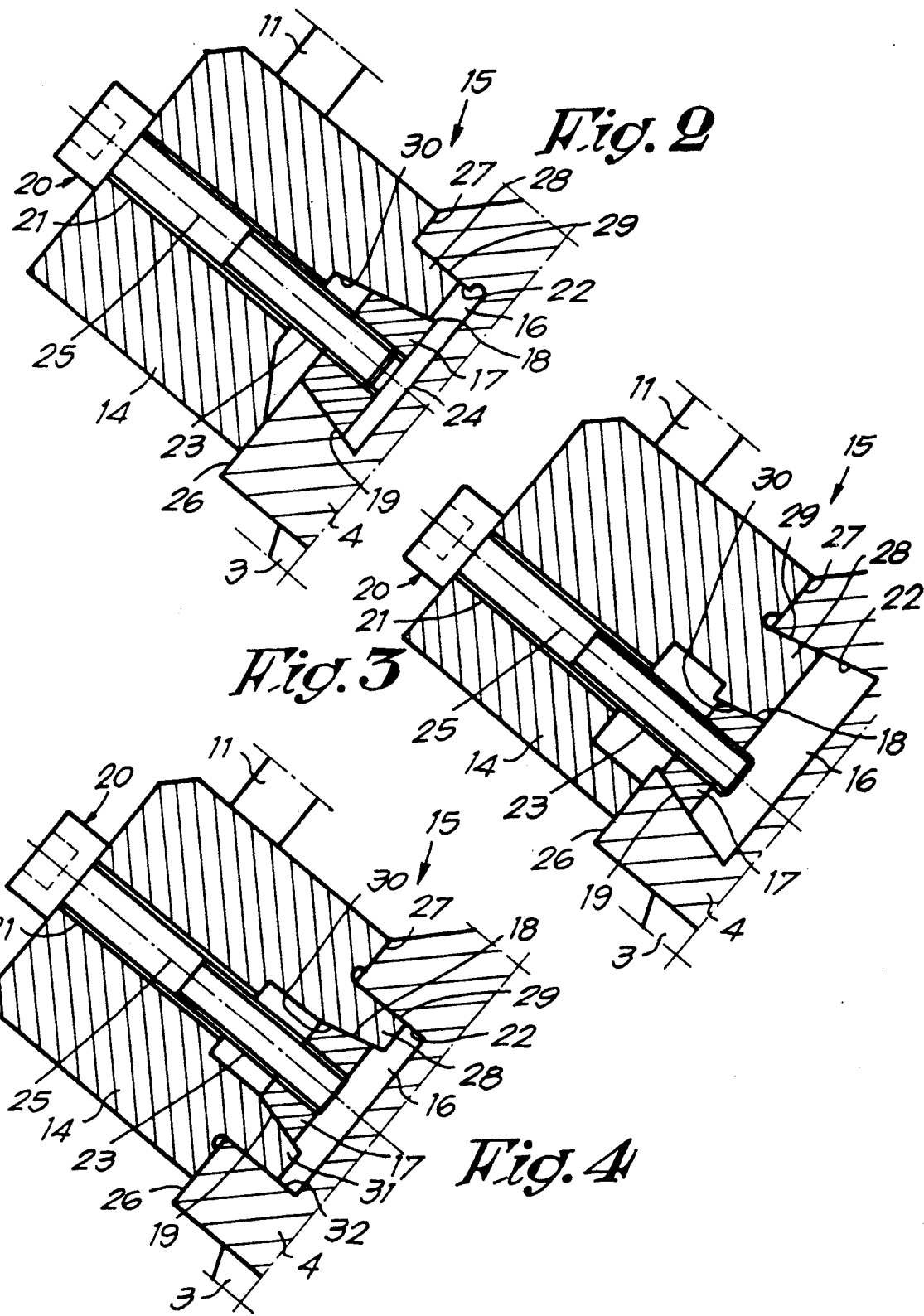

MECHANISM FOR MOUNTING A PART ON A LOOM SLEY

BACKGROUND OF THE INVENTION

The present invention concerns a mechanism for mounting a part on the sley of a weaving machine.

It is well known that in weaving machines, it is required that parts such as relay nozzles, rapier guide hooks, weft detectors and the like can be easily and rapidly mounted in the right place on the sley beam. Moreover, some of these parts must be well aligned after being mounted, which means, for example, that in the case of the relay nozzles, the blow openings of the different relay nozzles must be positioned on one line parallel to the longitudinal direction of the sley.

A well-known mechanism for mounting such part on the sley of a weaving machine involves that the part is mounted by means of a bolt which can be screwed into the sley via a threaded bore hole. In this way, the bolt can move freely through the bore hole, made in the holder, fixture, etc. of the part. The bolt has some play in the holder, in a way that the holder can be pressed onto a supporting rib which stretches out over the length of the sley, which makes it possible to align several of these holders and their respective parts.

This mechanism has the disadvantage that the parts can only be mounted in particular places, i.e. places in the sley which have been provided with tapped holes. Another disadvantage consists in that said holder must be pressed onto the supporting rib while the bolt is being fixed.

Another well-known mechanism involves that a bolt which fits in the opening of the holder of the part acts onto a nut-shaped clamp which can move freely in a T-shaped groove stretching out over the length of the sley. This mechanism has the disadvantage that the clamp can only be mounted in the groove from a side of the sley, which complicates the mounting.

A mechanism which does not imply said disadvantages is known from the U.S. Pat. No. 4,732,178 which described a relay nozzle mounting. According to this mechanism, the relay nozzle is provided with a holder which is fixed onto the sley beam by means of a bolt which acts onto a clamp working in conjuction with the sley beam. The clamp acts onto a longitudinal groove in the sley beam, and its shape is such that it has a gripping face on one side only, which works in conjunction with one lateral surface of the groove. This construction has the disadvantage, however, that the bolt is under bending strain while being fixed, as a result of which it can be damaged when put under great tension force.

According to the construction known from the American U.S. Pat. No. 4,732,178, an extra support on the sley beam, such as a collar, is required in order to be able to align the relay nozzles also in the height. As a result, the construction of the sley, and in particular of the sley beam, is made more complicated and more expensive.

SUMMARY OF THE INVENTION

The present invention concerns a mechanism for mounting parts such as relay nozzles on a sley, which has none of the disadvantages mentioned above.

The mechanism includes: a holder on which the said part is mounted; a groove made in and stretching out over the length of the sley; a clamp which is to be mounted in the groove and which has gripping faces on two opposite sides, with a slanting position in relation to each other; screw means which fit in an opening of the holder and act onto the clamp, whereby the clamp, as the screw means are tightened, fixes the holder onto the sley and produces a gripping force in each of its gripping faces, characterized in that the holder has at least one protruding element which, the holder being mounted, is clamped between one of the gripping faces of the clamp and one lateral surface of the groove.

The construction according to the invention has the advantage that the screw means are not put under bending strain and that the groove in which the clamps of the respective relay nozzles are mounted also guarantees that the parts are aligned in the height, so that no separate supporting means are required.

BRIEF DESCRIPTION OF THE DRAWINGS

In order to explain the characteristics of the invention, by way of example only and without being limitative in any way, the following preferred embodiments are described with reference to the accompanying drawings, where:

FIG. 2 shows, on a larger scale, the part indicated in FIG. 1 as F2;

FIGS. 3 and 4 show different variants of the part represented in FIG. 2.

DETAILED DESCRIPTION OF THE PREFERRED EMBODIMENTS

Figure 1:
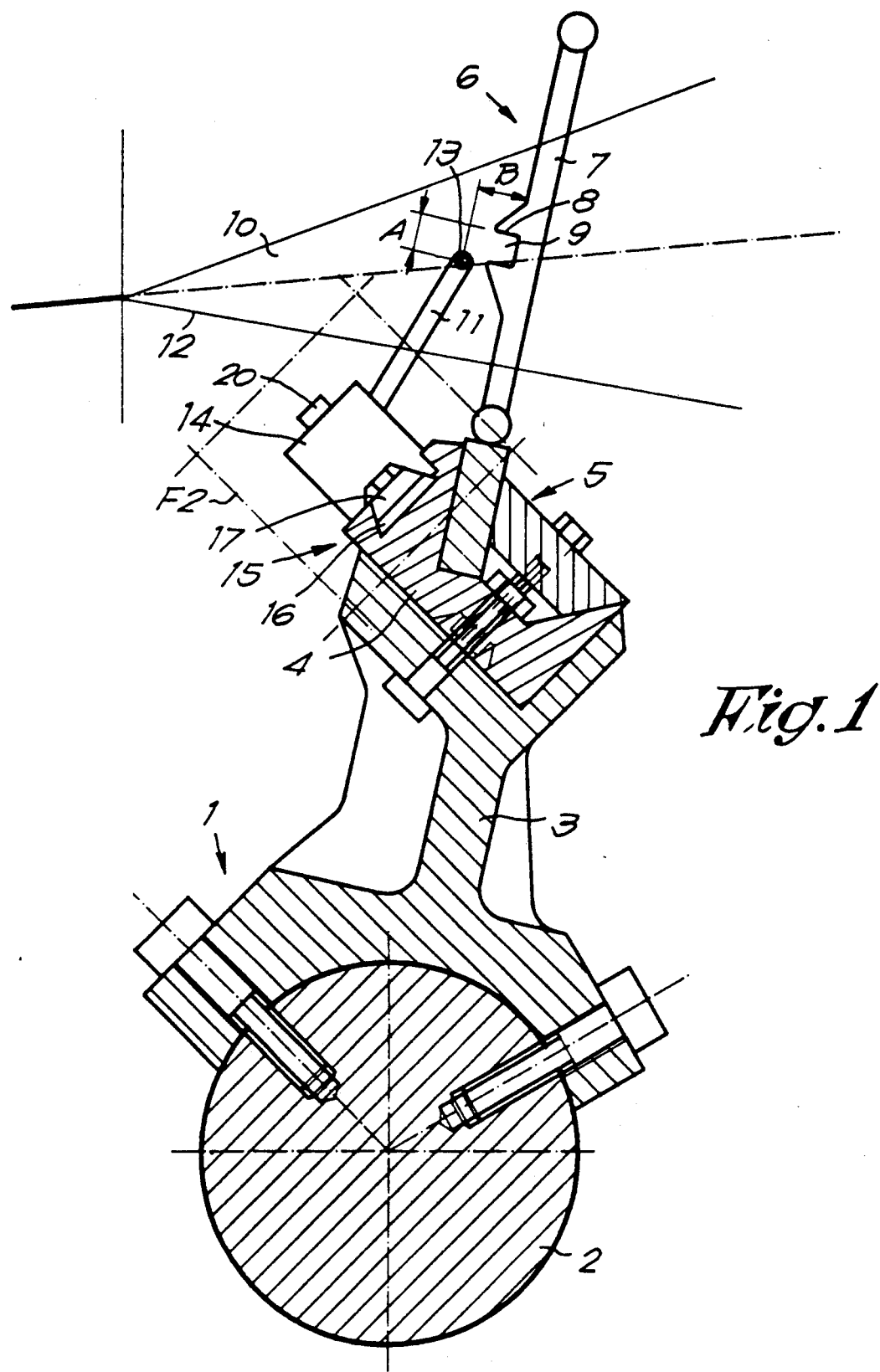
FIG. 1 is a cross-section of a sley on which a relay nozzle has been mounted by means of a mechanism according to the invention.

FIG. 1 shows the sley 1 of a weaving machine, which, as is known, is mainly composed of a sley shaft 2 driven to and fro, a sley beam 4 attached onto the sley shaft 2 by means of sley swords 3, and a reed 6 attached onto the sley beam 4 by means of clamping means 5. In airjet weaving machines, the reed 6 is provided with U-shaped reed lamellae 7 which define a conveyor channel 8, through which the weft threads 9 are inserted into the shed 10 by means of a jet of compressed air. In order to maintain the jet of compressed air over the entire length, relay nozzles 11 having one or more blow openings 13 at their upper ends are presented through the lower warp threads 12 while the a weft thread 9 is being inserted. Therefore, the nozzles 11, together with their holders 14, are mounted onto the sley beam 4, in such a way that, lengthwise, they can be placed in any position, and that they are automatically aligned when mounted, in such a way that the blow openings 13 of the respective relay nozzles are positioned in one line, parallel to the longitudinal direction of the reed 6, in other words, that the distances A and B indicated in FIG. 1 are the same for all relay nozzles 11.

The present invention concerns a mechanism 15 means to mount such a relay nozzle 11 on the sley, and which has the advantages mentioned above. Therefore, this mechanism 15, as shown in FIGS. 1 to 4, is mainly composed of the above-mentioned holder 14 on which the actual relay nozzle 11 is mounted; a groove 16 made in and stretching out over the length of the sley 1, more in particular of the sley beam 4; a clamp 17 meant to be mounted in the groove 16 and which has gripping faces 18 and 19 on two opposite sides, having a slanting position in relation to each other; and screw means 20 which fit in an opening 21 into the holder 14 and act onto the clamp 17, whereby the clamp 17, as the screw means 20 are tightended, fixes the holder 14 onto the sley 1 and provides a gripping force to each of its gripping faces 18 and 19, whereby the holder 14 has at least one protruding element which, the holder being mounted, is clamped between the gripping face 18 of the clamp 17 and a lateral side 22 of the groove.

The screw means 20 consist in preference of a bolt whose thread end 23 can be screwed into a bore hole 24 made in the clamp 17 and provided with thread. The clamp 17 consists in preference of a prismatic body which stretches over a certain part of the length of the longitudinal groove 16 and which has a trapezoidal cross section. Both gripping faces 18 and 19 should in preference be at angle with the longitudinal axis 25 of the screw means, for example in such a way that said longitudinal axis 25 forms the bisector between them. Moreover, the longitudinal axis 25 is in preference at right angles to the surface 26 to which the holder 14 is fixed.

In preference, the holder 14 should also rest, on both sides of the groove 16, on the surface 26 of the sley 1, in particular of the sley beam 4.

In the embodiments according to FIGS. 2 and 3, the holder 14 is clamped, at one side of the clamp 17 only, between the gripping face 18 in question and the lateral side 22 of the groove 16. Therefore, the holder 14 has, at the surface 27 with which it is fixed onto the sley, a protruding element in the form of an edge 28 stretching out in the lengthwise direction of the groove 16, of which one lateral surface 29 links up with the lateral side 22 of the groove 16, whereas the other lateral surface 30 links up with the gripping face 18 of the clamp 17. According to the cross-section in FIG. 2, the lateral side 22 and the lateral surface 29 are parallel to the longitudinal axis 25 of the screw means.

FIG. 3 shows a variant where the lateral side 22 and the lateral surface 29 are at angle with the longitudinal axis 25, and where the groove 16 is made in the form of a dovetail. The lateral surfaces 29 and 30 can be parallel.

The construction according to the invention makes it possible to mount a relay nozzle 11, together with its holder 14, the screw means 20 and the clamp 17 in the groove 16 when they are in an assembly but not yet tightened situation, so that the different relay nozzles 11 are automatically aligned when the screw means 20 are tightened, because, in the height, the protruding edge 28 is fixed onto the lateral side 22, and, crosswise, the holder 14 is drawn against the surface 26. It is clear that no separate support means are required to align the relay nozzles in the height, as the groove 16 itself is used for this purpose according to the present invention.

Although the construction according to FIGS. 2 and 3 is to be preferred, it is possible to provide the holder 14 with two protruding elements, for example in the shape of parallel, protruding edges 28 and 31, which are clamped, on both sides of the clamp 17, between said clamp and the lateral sides 22 and 32 respectively of the groove 16. In this case, both protruding edges 28 and 31 have in preference the same shape as the protruding edge 28 in FIG. 2, whereby the groove 16 has two parallel lateral sides 22 and 32 in that particular case. Said protruding edges 28 and 31 are clamped because they are slightly bent, and the gripping force is a result of the friction between the protruding edges 28 and 31 on the one hand, and the lateral sides 22 and 32 of the groove 16 on the other hand.

The present invention is in no way limited to the embodiments described and shown in the drawings; on the contrary, such a mechanism for mounting a relay nozzle on the sley of a weaving machine can be made in various variants while still remaining within the scope of the invention.

We claim:

1. A mechanism for mounting a part on a sley of a weaving machine, comprising a holder on which said part is mounted; said holder including a protruding element and an opening which extends through the holder; a groove in and extending a length of the sley, said groove having lateral faces; a clamp mounted in the groove having two non-intersecting non-parallel faces; and tightening means which fit through said opening for causing said protruding element on said holder to be clamped between one of said non-parallel faces of the clamp and one of said lateral faces of the groove.

2. A mechanism as claimed in claim 1 wherein said non-parallel faces of the clamp each are at a nonzero angle in respect to a principal longitudinal axis of the tightening means, and wherein points of intersection of the longitudinal axis with surfaces in which the non-parallel faces are situated on one side of the clamp.

3. A mechanism as claimed in claim 1 wherein the holder rests on the sley on two sides of the groove.

4. A mechanism as claimed in claim 3 wherein a principal longitudinal axis of the tightening means is at right angles to a surface of the sley on which the holder is mounted.

5. A mechanism as claimed in claim 1 wherein the clamp has a generally trapezoidal cross section, a principal longitudinal axis of the tightening means forming a bisector between the non-parallel faces of the clamp.

6. A mechanism as claimed in claim 1 wherein the protruding element includes an edge portion provided on the holder, a lateral surface of the edge portion engaging a lateral face of the groove when the part is mounted, and another lateral surface of the edge portion engaging a corresponding non-parallel face of the clamp.

7. A mechanism as claimed in claim 6 wherein the holder is clamped on one side of the clamp only, between one of said non-parallel faces and a lateral face of the groove.

8. A mechanism as claimed in claim 6 wherein the lateral surface of the edge portion which engages a lateral side of the groove, and said lateral side of the groove engaged by the lateral surface of the edge portion, are parallel to a principal longitudinal axis of the tightening means.

9. A mechanism as claimed in claim 6 wherein the lateral surface of the edge portion which engages a lateral side of the groove, and said lateral side of the groove engaged by the lateral surface of the edge portion, are at a nonzero angle in respect to a longitudinal axis of the tightening means.

10. A mechanism as claimed in claim 9 wherein said lateral surface of the elements are parallel to each other.

11. A mechanism claimed in claim 1 wherein the holder has two protruding edge portions which are clamped on both sides of the clamp between the respective non-parallel faces of the clamp and the lateral faces of the groove.

12. A mechanism as claimed in claim 1 wherein the tightening means includes a bolt whose threaded end is screwed into a threaded bore hole in the clamp.

* * * * *